(12) United States Patent
Iizuka et al.

(10) Patent No.: US 8,037,374 B2
(45) Date of Patent: Oct. 11, 2011

(54) COMMUNICATION TERMINAL DEVICE AND RECEPTION ENVIRONMENT REPORTING METHOD

(75) Inventors: Yousuke Iizuka, Yokosuka (JP);
Shinsuke Ogawa, Yokohama (JP);
Yukihiko Okumura, Yokohama (JP)

(73) Assignee: NTT DoCoMo, Inc., Chiyoda-ky, Tokyo (JP)

( * ) Notice: Subject to any disclaimer, the term of this patent is extended or adjusted under 35 U.S.C. 154(b) by 185 days.

(21) Appl. No.: 12/426,817

(22) Filed: Apr. 20, 2009

(65) Prior Publication Data

US 2009/0287970 A1 Nov. 19, 2009

(30) Foreign Application Priority Data

Apr. 21, 2008 (JP) ................................. 2008-110576

(51) Int. Cl.
*G06F 11/08* (2006.01)
*G06F 11/30* (2006.01)

(52) U.S. Cl. ........................................ 714/704; 714/712

(58) Field of Classification Search ........................ None
See application file for complete search history.

(56) References Cited

U.S. PATENT DOCUMENTS

| 7,295,538 | B2 | 11/2007 | Aizawa et al. |
| 2004/0266358 | A1 | 12/2004 | Pietraski et al. |
| 2005/0053038 | A1 | 3/2005 | Kimura |
| 2006/0111100 | A1 | 5/2006 | Murata et al. |
| 2006/0203727 | A1 | 9/2006 | Aizawa et al. |
| 2007/0147289 | A1 | 6/2007 | Nibe |
| 2008/0004062 | A1 | 1/2008 | Nibe |

FOREIGN PATENT DOCUMENTS

| EP | 1 513 282 A2 | 3/2005 |
| EP | 1 592 139 A2 | 11/2005 |
| JP | 2004-266353 A | 9/2004 |
| JP | 2005-064947 | 3/2005 |
| JP | 2005-64963 A | 3/2005 |
| JP | 2005-86304 | 3/2005 |
| JP | 2005-323003 | 11/2005 |
| JP | 3753698 | 12/2005 |
| JP | 2006-157133 | 6/2006 |
| JP | 2006-295842 A | 10/2006 |
| JP | 2007-180926 | 7/2007 |
| JP | 2007-521750 A | 8/2007 |

(Continued)

OTHER PUBLICATIONS

Technical Specification, "3GPP TS 25.214 V5.11.0, 3rd Generation Partnership Project; Technical Specification Group Radio Accdess Network; Physical layer procedures (FDD) (Release 5)", Jun. 2005, pp. 1-51.

(Continued)

*Primary Examiner* — Jeffrey A Gaffin
*Assistant Examiner* — Dipakkumar Gandhi
(74) *Attorney, Agent, or Firm* — Crowell & Moring LLP

(57) ABSTRACT

A communication terminal device and a reception environment reporting method produce a more excellent throughput, by making a report of a reception environment with higher accuracy. An SIR measuring section measures an SIR from a reception signal that has been received from a base transceiver station. A CQI converter converts the SIR that has been measured by the SIR measuring section into a CQI value. A BLER calculating section calculates a block error rate of the reception signal. A CQI correcting section corrects the CQI value that has been calculated by the CQI converter, in accordance with the block error rate. A CQI transmitter transmits the CQI value that has been corrected by the CQI correcting section, to the base transceiver station.

4 Claims, 11 Drawing Sheets

FOREIGN PATENT DOCUMENTS

| | | |
|---|---|---|
| JP | 2008-519562 A | 6/2008 |
| WO | WO 2005/006568 A2 | 1/2005 |
| WO | WO 2006/052448 A2 | 5/2006 |
| WO | WO 2006/095398 A1 | 9/2006 |
| WO | WO 2007/037412 A1 | 4/2007 |

OTHER PUBLICATIONS

Japanese Office Action w/Translation, dated Feb. 2, 2010, 8 pages.
European Search Report, dated Mar. 29, 2010, 11 pages.

*FIG. 4*
| CQI VALUE | TBS | NUMBER OF HS-PDSCHs | MODULATION | REFERENCE POWER ADJUSTMENT |
|---|---|---|---|---|
| 0 | N/A | \multicolumn{3}{c}{Out of range} | |
| 1 | 137 | 1 | QPSK | 0 |
| 2 | 173 | 1 | QPSK | 0 |
| 3 | 233 | 1 | QPSK | 0 |
| 4 | 317 | 1 | QPSK | 0 |
| 5 | 377 | 1 | QPSK | 0 |
| 6 | 461 | 1 | QPSK | 0 |
| 7 | 650 | 2 | QPSK | 0 |
| 8 | 792 | 2 | QPSK | 0 |
| 9 | 931 | 2 | QPSK | 0 |
| 10 | 1262 | 3 | QPSK | 0 |
| 11 | 1483 | 3 | QPSK | 0 |
| 12 | 1742 | 3 | QPSK | 0 |
| 13 | 2279 | 4 | QPSK | 0 |
| 14 | 2583 | 4 | QPSK | 0 |
| 15 | 3319 | 5 | QPSK | 0 |
| 16 | 3565 | 5 | 16-QAM | 0 |
| 17 | 4189 | 5 | 16-QAM | 0 |
| 18 | 4664 | 5 | 16-QAM | 0 |
| 19 | 5287 | 5 | 16-QAM | 0 |
| 20 | 5887 | 5 | 16-QAM | 0 |
| 21 | 6554 | 5 | 16-QAM | 0 |
| 22 | 7168 | 5 | 16-QAM | 0 |
| 23 | 7168 | 5 | 16-QAM | -1 |
| 24 | 7168 | 5 | 16-QAM | -2 |
| 25 | 7168 | 5 | 16-QAM | -3 |
| 26 | 7168 | 5 | 16-QAM | -4 |
| 27 | 7168 | 5 | 16-QAM | -5 |
| 28 | 7168 | 5 | 16-QAM | -6 |
| 29 | 7168 | 5 | 16-QAM | -7 |
| 30 | 7168 | 5 | 16-QAM | -8 |
 TBS INCREASES BY 1.3 TIMES
 TBS INCREASES BY 1.07 TIMES

FIG. 7

| | | MOBILE SPEED | | |
|---|---|---|---|---|
| | | ~30km/h | 30km/h~ | 120km/h~ |
| BLOCK ERROR RATE | 5% | +1 | +2 | +4 |
| | 10% | 0 | 0 | 0 |
| | 20% | 0 | 0 | 0 |
| | 30% | 0 | −2 | −2 |
| | 40% | −1 | −2 | −4 |

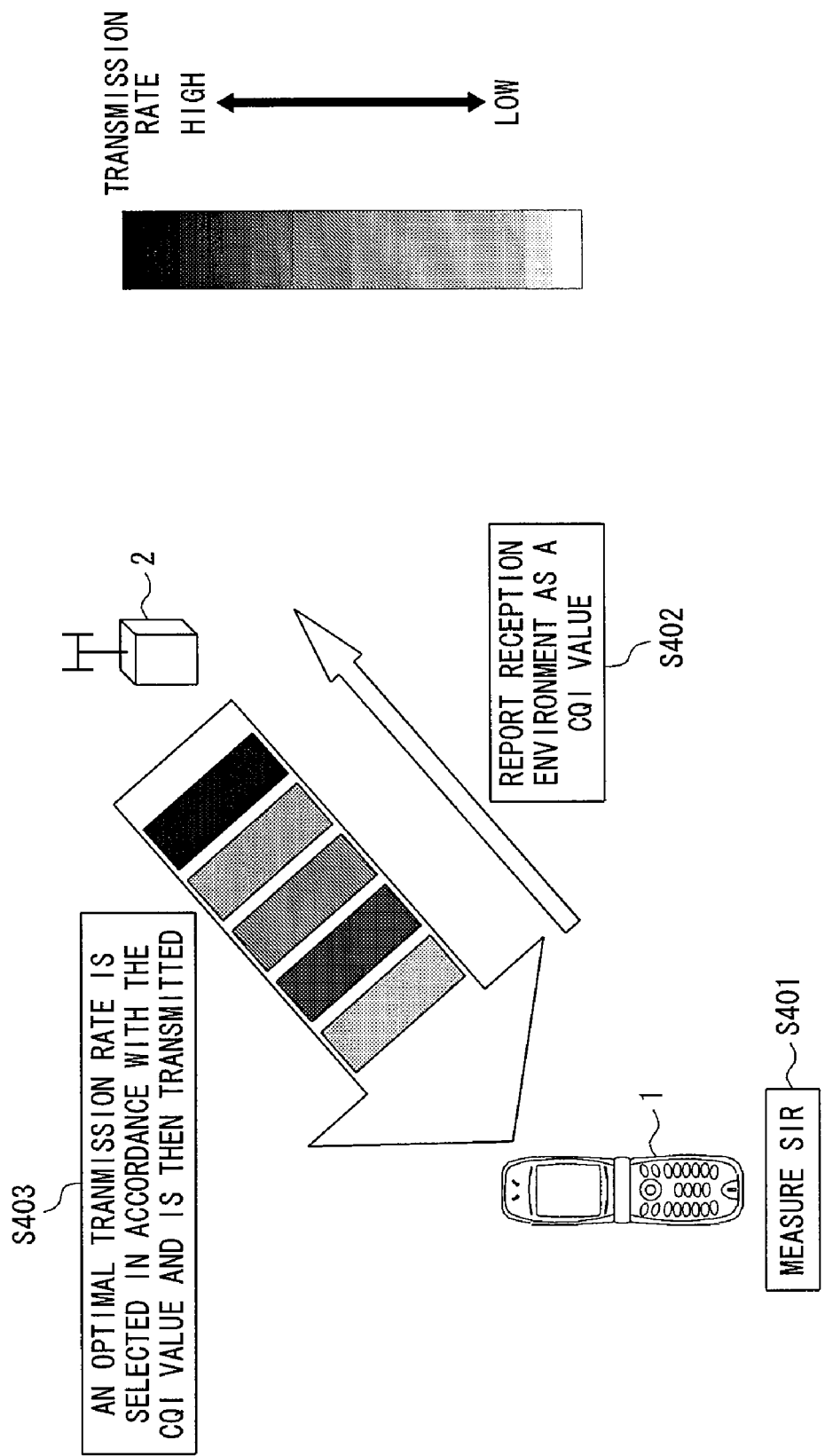

COMMUNICATION TERMINAL DEVICE AND RECEPTION ENVIRONMENT REPORTING METHOD

BACKGROUND OF THE INVENTION

1. Field of the Invention

The present invention relates to a communication terminal device that controls control functions in a reception environment, and to a reception environment reporting method.

2. Description of the Related Art

With the rapid Internet spread in recent years, diversification of information, larger volume of information, and development of the next-generation Internet, research and development of the next-generation radio access network system that realizes a fast radio transmission system in mobile communication. In such a next-generation fast radio access network such as High Speed Downlink Packet Access (HSDPA), namely the fourth-generation communications system, Adaptive Modulation and channel Coding (AMC) that varies the throughput according to the reception environment of a mobile device is applied. Hence, the report on the reception environment of the mobile device plays an important role.

As indexes of the reception environment of the mobile device, there are Signal-to-Interference power Ratio (SIR), Received Signal Code Power (RSCP), Channel Quality Indicator (CQI), and the like. In particular, CQI is widely used in AMC, as described in "3rd Generation Partnership Project: Technical Specification Group Radio Access Network: Physical Layer Procedures (FDD) (Release 5)" in 3GPP TS 25.214 V5.11.0 (2005-06) (hereinafter, referred to as non-Patent Document 1).

Referring now to FIG. 10, the configuration of a mobile device 1 adapted to a conventional AMC is shown. An RX radio section 11 of the mobile device 1 amplifies signals transmitted from a base transceiver station 2 and converts the signals into digital ones, so as to perform a reverse diffusion process on each Common Pilot Channel (CPICH), a control signal, and a data signal. A RAKE synthesizer 13 performs RAKE synthesis on the signal of each path subsequent to the reverse diffusion process. A rate information detector 17 detects rate information from the control signal output from the RAKE synthesizer 13. A decoder 18 decodes the data signal output from the RAKE synthesizer 13 based upon the rate information, and obtains the received user data.

An SIR measuring section 14 measures an SIR from CPICH output from the RAKE synthesizer 13. A CQI converter 15 converts the SIR measured by the SIR measuring section 14 into a CQI. In this process, the CQI value of the mobile device 1 is set in such a manner that a Block Error Rate (BLER) of the SIR value should not exceed 10% of the target value defined in a CQI mapping table specified by 3GPP, under the current environment. Generally, an SIR-CQI conversion table that satisfies the above condition is prepared beforehand, so that the CQI value is calculated from the SIR value by use of the conversion table. A CQI transmitter 16 transmits the CQI value that has been calculated by the CQI converter 15 to a base transceiver station.

FIG. 11 is a view showing a communication control procedure by means of the AMC. The mobile device 1 measures the SIR value from the CPICH value of the signal that has been received from a base transceiver station 2 (step S401), converts the measured SIR value into the CQI value and transmits the CQI value to the base transceiver station 2, so as to make a report of the reception environment (step S402).

The base transceiver station 2, in response to the CQI value received from the mobile device 1, selects the optimal transmission rate (hereinafter, simply referred to as TBS, an abbreviation for Transport Block Size), and transmits signals to the mobile device 1 by means of the TBS (step S403). Thus, the optimal throughput is achieved.

Regarding the SIR value measured by the mobile device, the measurement accuracy is significantly degraded depending on the change in the environment such as the mobile speed of the mobile device, thereby resulting in the degradation of the throughput. For instance, in a case where the mobile speed of the mobile device 1 is low (for example, equal to or lower than 30 km/h), the variance of the received signal is relatively small due to the low-speed phasing and the SIR value is measured with substantial accuracy. In a case where the mobile speed is high, the wider signal variance occurs. This causes the interference component to be calculated greater. Therefore, the SIR value is measured to be smaller than the actual environment, so the mobile device 1 may make a report of a smaller CQI value.

If the mobile device 1 makes a report of a value greater than an appropriate CQI value, a signal with a greater TBS will be transmitted from the base transceiver station 2, thereby leading to the increased block error rate. Consequently, the throughput will be degraded. Conversely, if the mobile device 1 makes a report of a smaller CQI value, a signal with a smaller TBS will be transmitted from the base transceiver station 2, thereby decreasing the block error rate. However, also in this case, the throughput will be degraded.

In order to prevent the degradation of the throughput caused by the report of an inappropriate CQI value, the CQI value is corrected by the packet error rate in the third-generation communications system, as described in JP 2007-521750 A. Meanwhile, in the fourth-generation communications system to which the AMC is applied, there is a connection between the CQI value reported to the base transceiver station, and the TBS and the block error rate of the signal transmitted from the base transceiver station. Therefore, there is a technique of storing a conversion table in which 30 SIR threshold values and CQI values are related to a mobile device, updating the SIR threshold values of the conversion table when the "the number of normal reception times/the number of abnormal reception times" of the data block exceeds a given number of times, and adjusting the CQI value to be converted by use of the conversion table from the measured SIR value, as described in JP 2005-64963 A.

According to Patent Document 2, however, 30 SIR threshold values are increased or decreased at a time by the same value at the time of updating the conversion table. Such an update method of the conversion table does not always reflect the reception environment in detail. In addition, since the conversion table is updated when the "the number of normal reception times/the number of abnormal reception times" of the data block exceeds a given number of times, the update frequency of the conversion table is reduced depending on the settings of the given number of times. Accordingly, the reception environment cannot be reflected on the conversion table in a timely manner and the reception environment cannot be reported with accuracy. Furthermore, whenever the conversion table is updated, updating of 30 SIR threshold values is a complicated and wasteful process.

SUMMARY OF THE INVENTION

The present invention has been made in view of the above circumstances and provides a communication terminal device and a reception environment reporting method that achieves a more excellent throughput, by making a report of a reception environment with higher accuracy.

According to an aspect of the present invention, there is provided a communication terminal device including: a reception environment measuring section that measures a reception environment of a reception signal that has been received from a transmitter; a feedback value generating section that generates a feedback value for making a report of the reception environment that has been measured by the reception environment measuring section, the reception environment being controlled in a suitable manner by feeding back the reception environment to the transmitter; a block error rate calculating section that calculates a block error rate, which is a rate of occurrence of a reception error by each block; a correcting section that corrects the feedback value that has been generated by the feedback value generating section in accordance with the block error rate that has been calculated by the block error rate calculating section; and a reception environment reporting section that transmits to the transmitter the feedback value that has been corrected by the correcting section.

With such a configuration, the correcting section of the communication terminal device corrects the feedback value that has been generated by the feedback value generating section, in accordance with the block error rate that has been calculated by the block error rate calculating section. Then, the reception environment reporting section transmits the corrected feedback value to the transmitter. Therefore, whenever the feedback value is generated, the feedback value can be corrected to an appropriate value in accordance with the reception environment at each time, thereby making a more accurate reception environment report. Accordingly, a more excellent throughput is obtainable.

In the above communication terminal device, the correcting section may correct the feedback value so that the block error rate of the reception signal is closer to a predetermined optimal value.

With such a configuration, the correcting section corrects the feedback value so that the block error rate of the reception signal should be closer to a predetermined optimal value. It is therefore possible to achieve a more excellent throughput.

The above communication terminal device may further include a correspondence relationship memory that stores a correspondence relationship between a plurality of the feedback values and a transport block size of a signal to be expected to be transmitted from the transmitter that has received each of the plurality of the feedback values, wherein the correcting section determines a correction value with respect to the feedback value in accordance with a change in the transport block size in a case where the feedback value that has been generated by the feedback value generating section is changed.

With such a configuration, the correcting section determines the correction value for the feedback value in accordance with the change in the transport block size corresponding to a case where the feedback value that has been generated by the feedback value generating section is changed. Thus generated feedback value is not corrected uniformly. The correction value is dynamically determined in accordance with the feedback value, thereby enabling an appropriate correction.

In the above communication terminal device, the feedback value may be corrected in accordance with a mobile speed of the communication terminal device.

With such a configuration, the feedback value is corrected in accordance with the block error rate and the mobile speed of the communication terminal device. Even if the measurement accuracy of the reception environment is degraded by the movement of the communication terminal device, the feedback value is corrected to an appropriate value, thereby improving the throughput.

According to another aspect of the present invention, there is provided a reception environment reporting method including: measuring a reception environment of a reception signal that has been received from a transmitter; generating a feedback value for making a report of the reception environment that has been measured, the reception environment being controlled in a suitable manner by feeding back the reception environment to the transmitter; calculating a block error rate, which is a rate of occurrence of a reception error by each block; correcting the feedback value that has been generated in accordance with the block error rate that has been calculated; and transmitting to the transmitter the feedback value that has been corrected.

According to an aspect of the present invention, the correcting section of the communication terminal device corrects the feedback value that has been generated by the feedback generating section, in accordance with the block error rate that has been calculated by the block error rate calculating section. Then, the reception environment reporting section transmits the corrected feedback value to the transmitter. Therefore, whenever the feedback value is generated, the feedback value is corrected to an appropriate value in accordance with the reception environment at each time. It is therefore possible to make a more accurate reception environment report. This makes a more excellent throughput obtainable.

BRIEF DESCRIPTION OF THE DRAWINGS

FIG. 4 is a view showing a CQI mapping table specified in 3GPP 25.214;

FIG. 7 is an example of a CQI correction value calculating rule in which both of the mobile speed of the mobile device and the block error rate are used according to the third embodiment of the present invention;

FIG. 11 shows a communication control procedure by means of the conventional AMC.

DETAILED DESCRIPTION OF THE PREFERRED EMBODIMENTS

Figure 1:
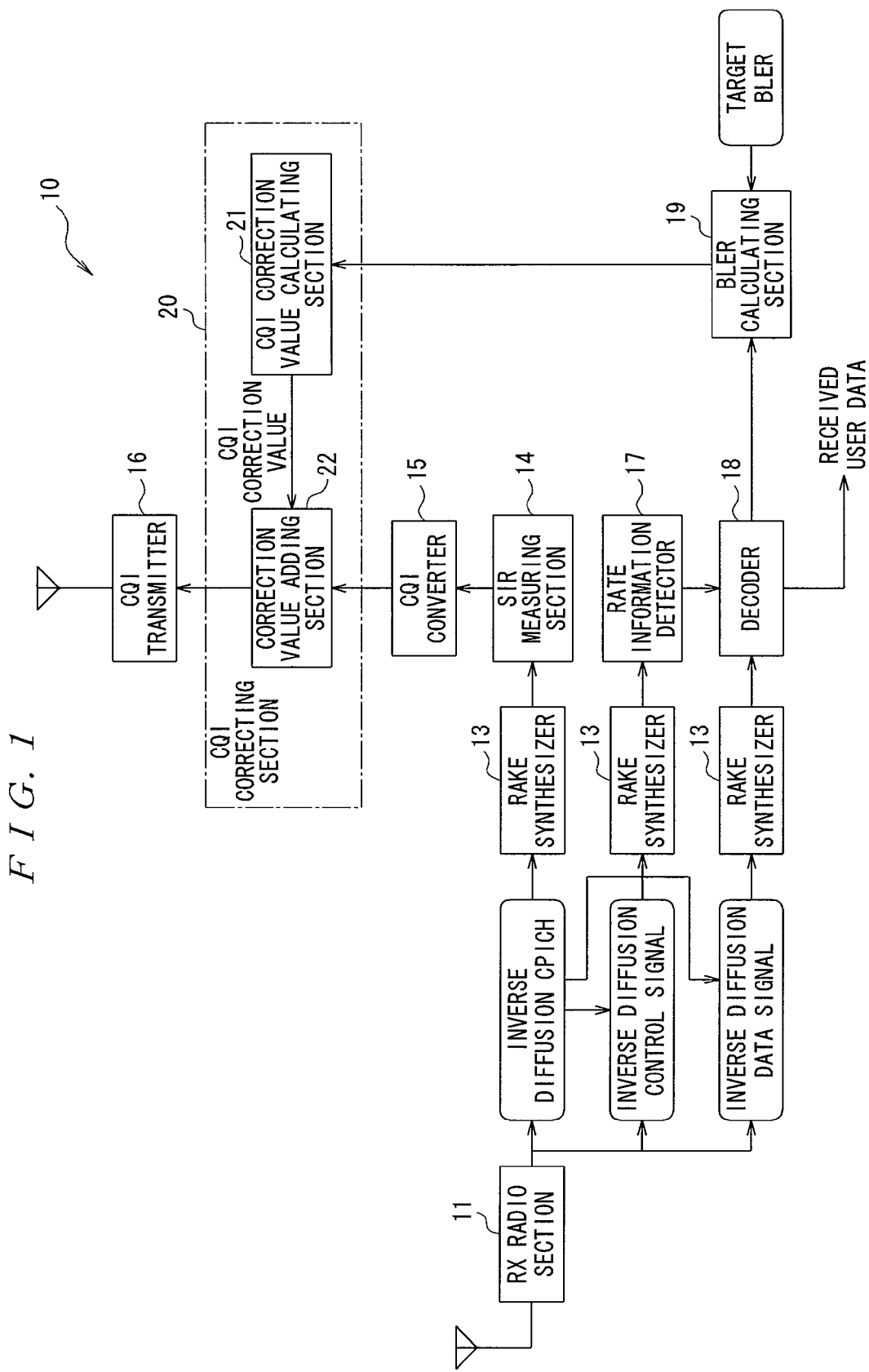
FIG. 1 illustrates a configuration of a mobile device according to a first embodiment of the present invention.

The embodiments of the present invention in which a communication terminal device according to an aspect of the present invention is applied to a mobile device of the fourth-generation mobile communications system that employs AMC (Adaptive Modulation and channel Coding) will now be described with reference to the drawings. In the following description, the same components and configurations as those employed in the drawings have the same reference numerals.

First Embodiment

Figure 10:
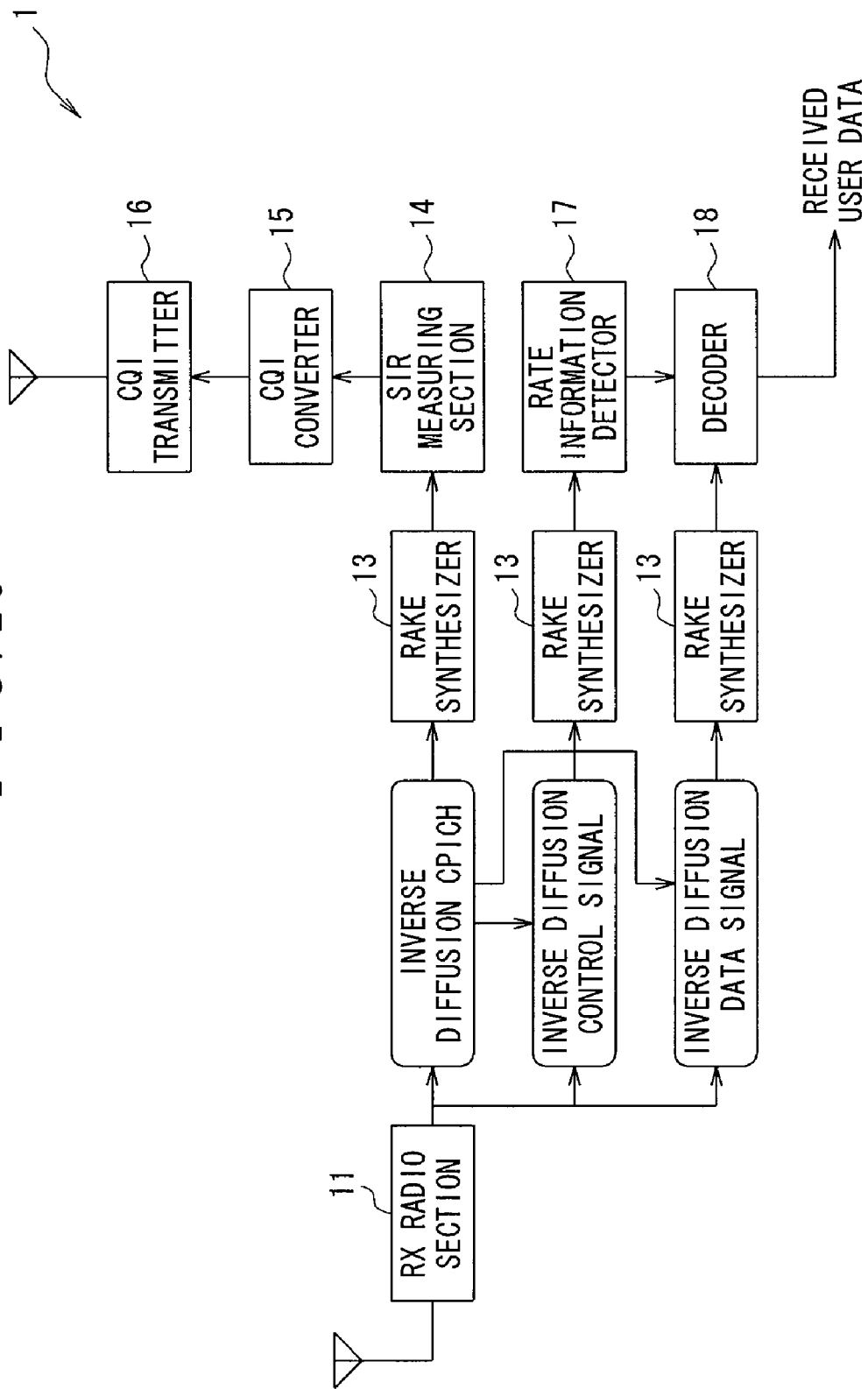
FIG. 10 shows the configuration of a mobile device applied to the conventional AMC.

A first embodiment of the present invention will now be described. FIG. 1 illustrates a configuration of a mobile device 10 according to the first embodiment of the present invention. The mobile device 10 according to the first embodiment of the present invention includes: the configuration of the conventional mobile device 10 shown in FIG. 10; a BLER calculating section 19 serving as block error rate calculating means; and a CQI correcting section 20 serving as correcting means. In addition, a non-volatile memory of the mobile device 10 stores a "target BLER" that is a predetermined optimal Block Error Rate (BLER). Herein, it is assumed that "10%" specified in 3GPP is set as the target BLER.

The BLER calculating section 19 determines an error by performing a Cyclic Redundancy Check (CRC) of the data signal that has been decoded by a decoder 18, and then calculates the block error rate indicative of the rate of occurrence of the reception error by the block.

When the block error rate is measured, each frame is relatively long, for example, 10 msec in the conventional system, such as W-CDMA and the like. This necessitates averaging in a longer period of several seconds so as to measure an accurate block error rate. However, each frame is 2 msec in the fourth-generation communications system that employs AMC and the retransmission technique is also applied, thereby permitting the error to be recovered by the retransmission even if the accuracy of the block error rate is low. According to the first embodiment of the present invention, the block error rate is measured in a short period of time (for example, 100 msec of an averaging period) so as to perform the CQI correction in a short cycle. Since the TBS information is included in a control signal transmitted from the base transceiver station, the block error rate is measured in accordance with the TBS (Transport Block Size) (When TBS is great, the averaging period is set to be short such as 50 msec. When TBS is small, the averaging period is set to be long such as 200 msec.), so that the measurement accuracy of the block error rate can be improved.

The CQI correcting section 20 corrects the CQI value that has been generated on a CQI converter 15. The CQI correcting section 20 includes: a CQI correction value calculating section 21; and a correction value adding section 22.

The CQI correction value calculating section 21 compares the target BLER with the block error rate that has been calculated by the BLER calculating section 19, and calculates the CQI correction value for correcting the CQI value that has been calculated by the CQI converter 15. For example, when the block error rate is 20%, the block error rate is greater than the target BLER (10%), which means that the reception environment is bad. Therefore, the CQI correction value is set to "−1". Meanwhile, when the block error rate is 5%, the block error rate is smaller than the target BLER, which means the reception environment is good. Therefore, the CQI correction value is set to "+1".

The correction value adding section 22 calculates a corrected CQI value, by adding the CQI correction value that has been calculated by the CQI correction value calculating section 21 to the CQI value that has been calculated by the CQI converter 15. A CQI transmitter 16 transmits to the base transceiver station the corrected CQI value that has been calculated by the correction value adding section 22.

Figure 2:
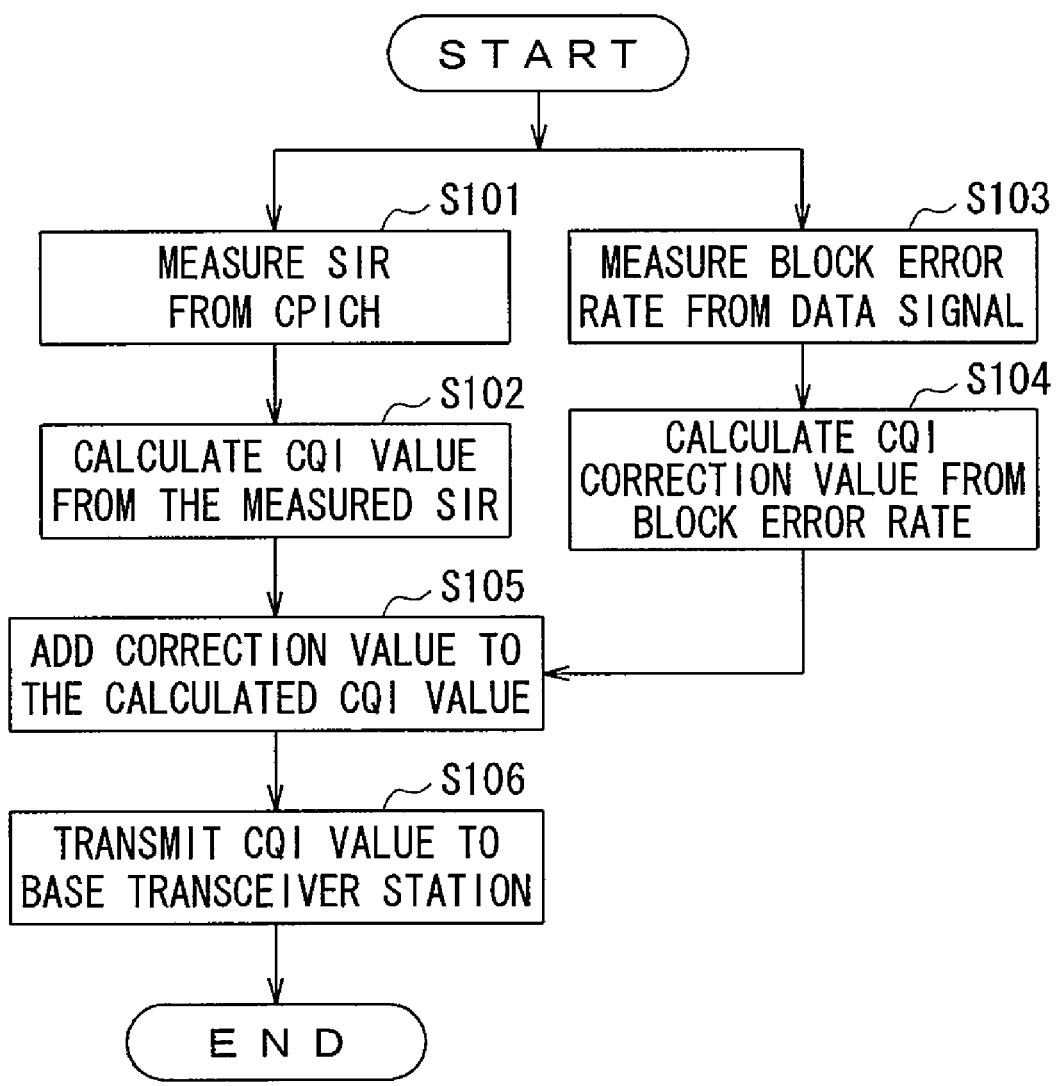
FIG. 2 is a flowchart illustrating a reception environment report process executed by the mobile device according to the first embodiment of the present invention.

Next, referring now to FIG. 2, a reception environment report process performed by the mobile device 10 according to the first embodiment of the present invention will be described.

An SIR measuring section 14 of the mobile device 10 measures an SIR value from CPICH (Common Pilot Channel), which has been received at an RX radio section 11 from the base transceiver station and which has been output from a RAKE synthesizer 13 (step S101). The CQI converter 15 calculates the CQI value from the SIR value that has been measured by the SIR measuring section 14.

A BLER calculating section 19 measures the block error rate from the data signal which has been received at the RX radio section 11 from the base transceiver station and which has been output from the RAKE synthesizer 13 (step S103). The CQI correction value calculating section 21 calculates the CQI correction value from the block error rate that has been calculated by the BLER calculating section 19 (step S104). The correction value adding section 22 adds the CQI correction value that has been calculated by the CQI correction value calculating section 21 to the CQI value that has been calculated by the CQI converter 15 (step S105). The CQI transmitter 16 transmits to the base transceiver station the CQI value that has been calculated by the correction value adding section 22 (step S106).

Second Embodiment

Figure 3:
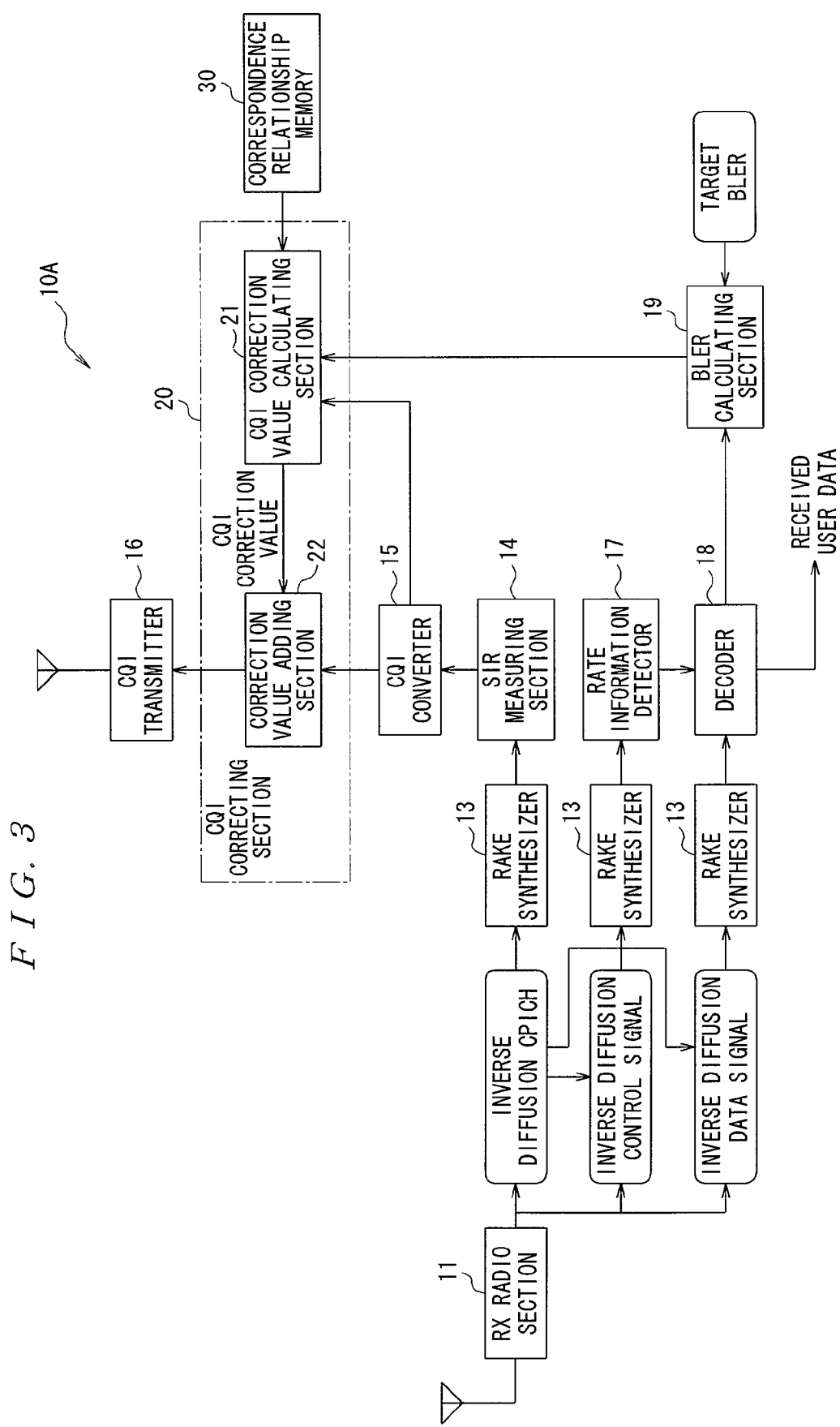
FIG. 3 illustrates a configuration of a mobile device according to a second embodiment of the present invention.

A second embodiment of the present invention will now be described. FIG. 3 illustrates a configuration of a mobile device 10A according to the second embodiment of the present invention. The mobile device 10A according to the second embodiment of the present invention further includes a correspondence relationship memory 30, in addition to the configuration of the mobile device 10 according to the first embodiment of the present invention.

The correspondence relationship memory 30 stores a CQI mapping table specified in 3GPP 25.214, as illustrated in FIG. 4. In the CQI mapping table, 31 CQI values from 0, 1, 2 . . . , and 30 are defined. Each of the CQI values is associated with transmission parameters, including TBS, the number of HS-PDSCHS, modulation, and reference power adjustment of the signal to be expected to be transmitted from the base transceiver station that has received each CQI value.

As is obvious from FIG. 4, increase and decrease values corresponded to a case where each CQI value is increased or decreased by 1, respectively, are not constant and have variations. For instance, the CQI value "12" corresponds to the TBS value "1742" and the CQI value "13" corresponds to the TBS value "2279". Accordingly, when the CQI value changes from "12" to "13", the TBS value increases by about 1.3 times (2279/1742). Meanwhile, the CQI value "15" corresponds to the TBS value "3319" and the CQI value "16" corresponds to the TBS value "3565". Accordingly, when the CQI value changes from "15" to "16", the TBS value increases by about 1.07 times (3565/3319).

Conversely, the effects of decreasing the block error rate when the CQI value is decreased by 1 are different between the case where the CQI value is "13" and the case where the CQI value is "16". Hence, the CQI correction value calculating section 21 determines the CQI correction value of a case where the CQI value that has been calculated by the CQI converter 15 is changed, according to the variation in the corresponding TBS value. For instance, in a case where the CQI value that has been calculated by the CQI converter 15 is "13", the decrease of the corresponding TBS value is great when the CQI value is decreased by 1 and the effect of decreasing the block error rate is great. Therefore, the CQI correction value calculating section 21 sets the CQI correction value to "−1". Meanwhile, in a case where the CQI value is "16", the decrease in the corresponding TBS value is small even if the CQI value is decreased by 1 and the effect of decreasing the block error rate is small. Therefore, any correction processes are not performed, or the CQI correction value is adjusted by setting the CQI correction value to be "−2".

Figure 5:
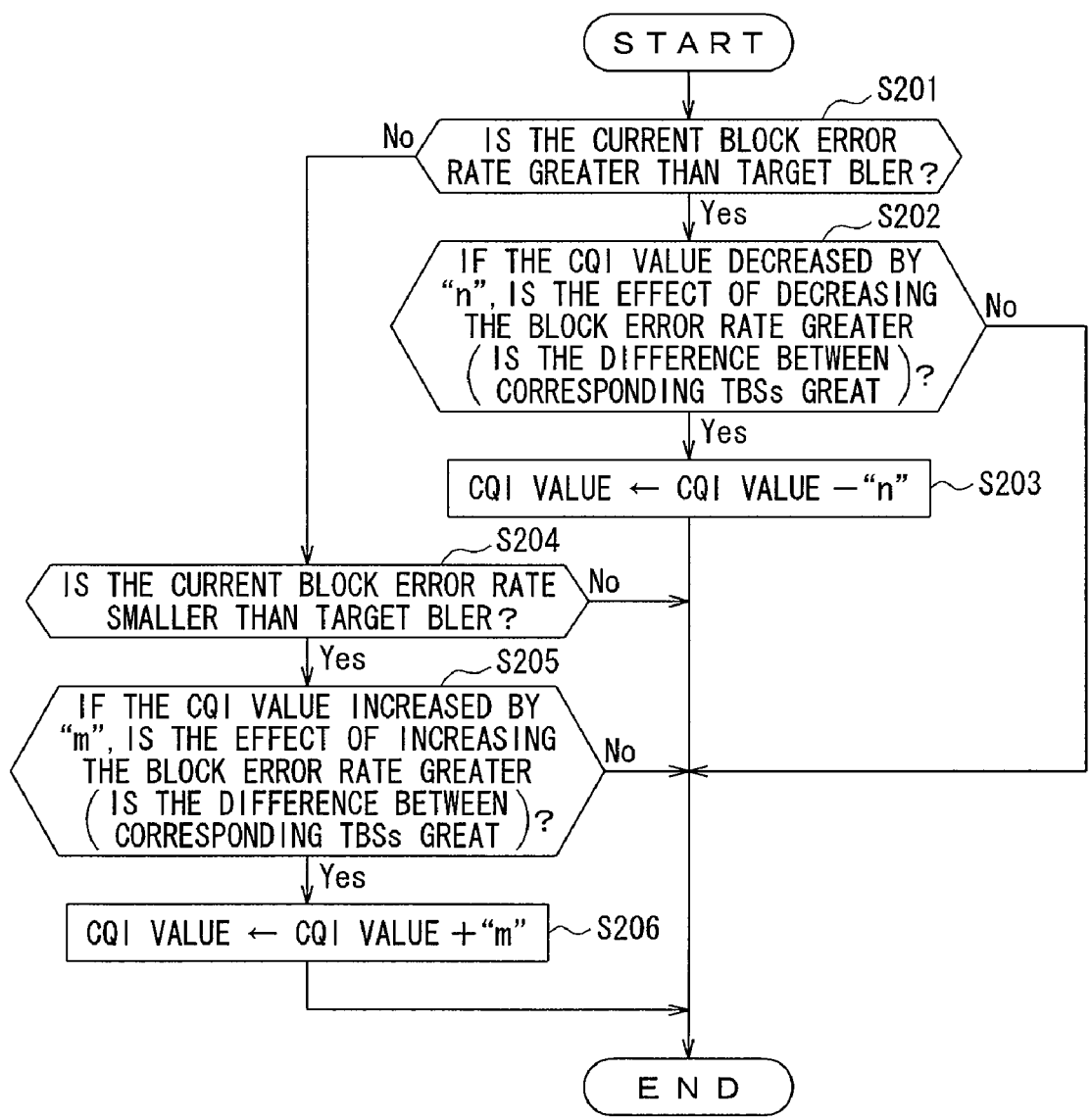
FIG. 5 is a flowchart illustrating a CQI correcting process performed by a CQI correcting section of the mobile device according to the second embodiment of the present invention.

Referring now to the flowchart of FIG. 5, a description will be given of the CQI correcting process performed by the CQI correcting section 20 in the mobile device 10A according to the second embodiment of the present invention.

The CQI correction value calculating section 21 determines where the block error rate that has been calculated by the BLER calculating section 19 is greater than the target BLER (step S201). When it is determined that the block error rate that has been calculated by the BLER calculating section 19 is greater than the target BLER (step S201: YES), the CQI correction value calculating section 21 refers to the CQI mapping table stored in the correspondence relationship memory 30. If the CQI value that has been calculated by the CQI converter 15 is decreased by "n", where n is a natural number, the CQI correction value calculating section 21 determines whether or not the difference between the corresponding TBS values is great and the effect of decreasing the block error rate is great (step S202). When it is determined that the effect of decreasing the block error rate is great (step S202: YES), the CQI correction value calculating section 21 determines the CQI correction value to be "n", and the correction value adding section 22 adds "n" to CQI value that has been calculated by the CQI converter 15 (step S203). Conversely, when it is determined that even if the CQI value that has been calculated by the CQI converter 15 is decreased by "n", the effect of decreasing the block error rate is still small (step S202: NO), processing is terminated without performing a correcting process because the effect is small even if the CQI value is corrected.

When it is determined that the block error rate that has been calculated by the BLER calculating section 19 is smaller than the target BLER (step S201: NO, step S204: YES), the CQI correction value calculating section 21 determines whether or not difference between the corresponding TBS values is great and the effect of decreasing the block error rate is great if the CQI value that has been calculated by the CQI converter 15 is increased by "m", where m is a natural number, by referring to the CQI mapping table stored in the correspondence relationship memory 30 (step S205). When it is determined that the effect of increasing the block error rate is great (step S205: YES), the CQI correction value calculating section 21 determines the CQI correction value to be "m". The correction value adding section 22 adds "m" to the CQI value that has been calculated by the CQI converter 15 (step S206). Conversely, when it is determined that even if the CQI value that has been calculated by the CQI converter 15 is decreased by "m", the effect of decreasing the block error rate is small (step S205: NO), processing is terminated without performing a correcting process because the effect is small even if the CQI value is corrected.

When the block error rate that has been calculated by the BLER calculating section 19 is equal to the target BLER (step S204: NO), the CQI value that has been calculated by the CQI converter 15 is assumed to be an appropriate one. Therefore, processing is terminated without performing a correcting process.

In this manner, since the CQI value is corrected by using both of the block error rate and the variation difference in the TBS values in the CQI mapping table, a more optimal report on the reception environment is enabled as compared to the conventional method. It is therefore possible to improve the throughput.

Third Embodiment

Figure 6:
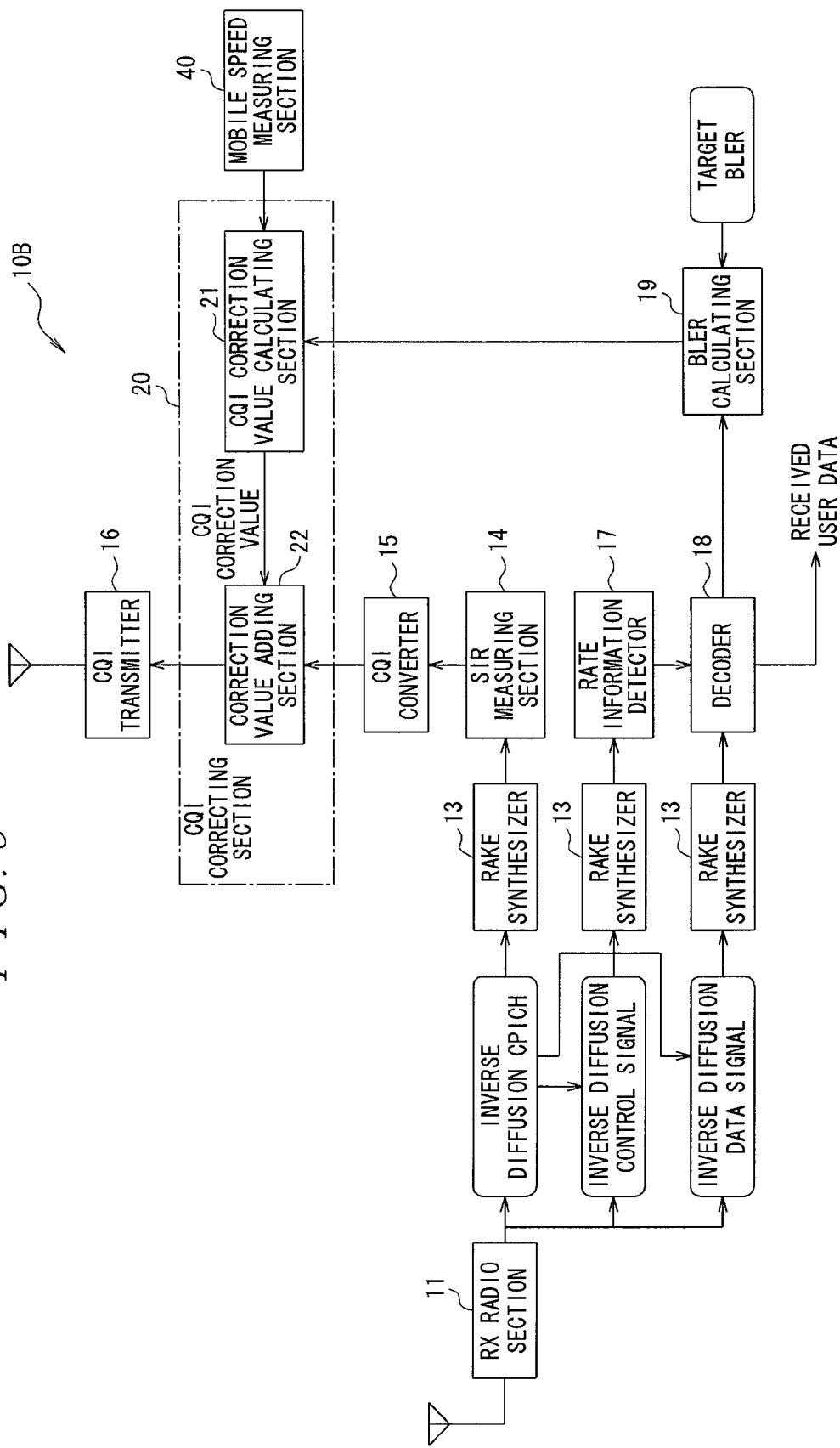
FIG. 6 illustrates a configuration of a mobile device according to a third embodiment of the present invention.

A third embodiment of the present invention will now be described. According to the third embodiment of the present invention, the CQI value is corrected by using both of the block error rate and a mobile speed of a mobile device. FIG. 6 illustrates a configuration of a mobile device 10B according to the third embodiment of the present invention. As illustrated, the mobile device 10B according to the third embodiment of the present invention further includes a mobile speed measuring section 40, in addition to the configuration of the mobile device 10 according to the first embodiment of the present invention.

The mobile speed measuring section 40 measures the mobile speed of the mobile device 10B. As a measuring method of measuring the mobile speed of the mobile device 10B, Global Positioning System (GPS) or a gyro may be mounted on the mobile device 10B. Alternatively, the mobile speed may be measured by the amount of change, in the location information of an adjacent base transceiver station, to be reported by the base transceiver station.

The CQI correction value calculating section 21 calculates the CQI correction value in accordance with the block error rate, and the mobile speed of the mobile device 10B, that has been measured by the mobile speed measuring section 40. Specifically, while the mobile device 10B is moving at a low speed (for example, 30 km/h or less), it is possible to measure the SIR value with accuracy and calculate an appropriate CQI value. Accordingly, the CQI correction value is suppressed to be small. Conversely, while the mobile device 10B is moving at a high speed (for example, 120 km/h or more), it is impossible to calculate an appropriate CQI value due to significant degradation of the SIR measurement. Accordingly, the CQI correction value is made to be great. Thereby, the throughput is expected to be improved.

FIG. 7 is an example of a CQI correction value calculating rule in which both of the mobile speed of the mobile device 10B and the block error rate are used. As shown in FIG. 7, the CQI correction value calculating rule is configured so that the absolute value of the CQI correction value should be greater, as the block error rate deviates from the optimal value (10-20% in FIG. 7) and as the mobile speed of the mobile device 10B is greater.

The table of the correction value calculating rule may be stored in the nonvolatile memory of the mobile device 10B, so that the CQI correction value calculating section 21 may calculate the CQI correction value in accordance with the table. Alternatively, the correction value calculating rule may be written in a program and stored in the nonvolatile memory of the mobile device 10B, so that the CQI correction value calculating section 21 may calculate the CQI correction value in accordance with the program.

Figure 8:
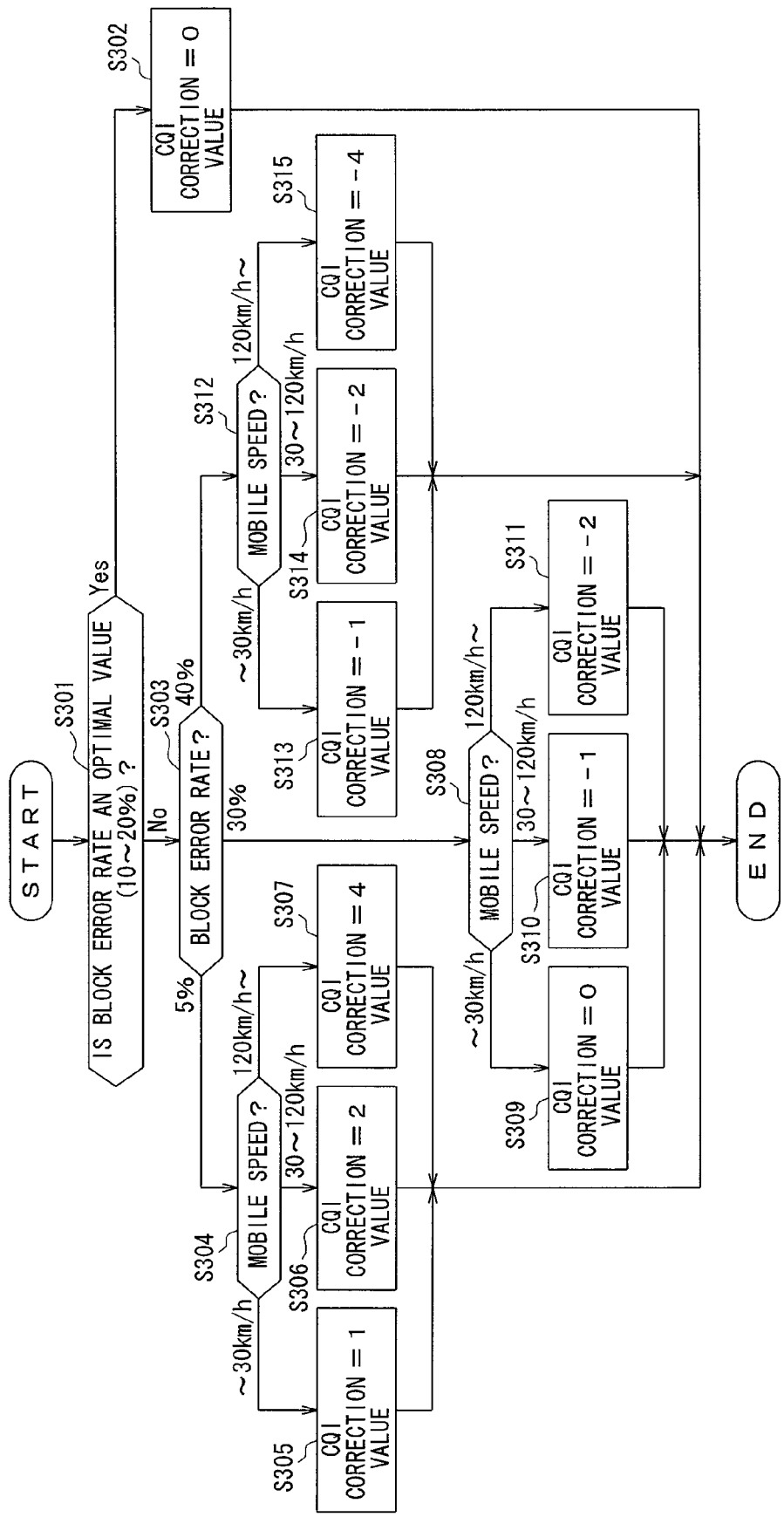
FIG. 8 is a flowchart illustrating a CQI correction value calculating process that a CQI correction value calculating section performs in accordance with the correction value calculating rule of FIG. 7 according to the third embodiment of the present invention.

Referring now to FIG. 8, a description will be given of a CQI correction value calculating process in which the CQI correction value calculating section 21 performs in accordance with the correction value calculating rule of FIG. 7.

Firstly, the CQI correction value calculating section 21 determines whether the block error rate that has been calculated by the BLER calculating section 19 is an optimal value (step S301). In a case where the block error rate is around 10% to 20% and is determined to be an optimal value (step S301: YES), the CQI correction value calculating section 21 sets the CQI correction value to "0" (step S302), and then processing is terminated.

Meanwhile, in a case where the block error rate is around 5% and is smaller than the optimal value (step S303: 5%), the CQI correction value calculating section 21 determines the mobile speed, of the mobile device 10B, that has been measured by the mobile speed measuring section 40 (step S304). When the mobile speed is smaller than 30 km/h, the CQI correction value is set to "+1" (step S305). When the mobile speed ranges 30 km/h to 120 km/h, the CQI correction value is set to "+2" (step S306). When the mobile speed exceeds 120 km/h, the CQI correction value is set to "+4" (step S307).

Meanwhile, in a case where the block error rate is around 30% and is slightly greater than the optimal value (step S303: 30%), the CQI correction value calculating section 21 determines the mobile speed of the mobile device 10B (step S308). When the mobile speed is smaller than 30 km/h, the CQI correction value is set to be "0" (step S309). When the mobile speed ranges 30 km/h to 120 km/h, the CQI correction value is set to be "−1" (step S310). When the mobile speed exceeds 120 km/h, the CQI correction value is set to be "−2" (step S311).

Meanwhile, in a case where the block error rate is around 40% and is considerably greater than the optimal value (step S303: 40%), the CQI correction value calculating section 21 determines the mobile speed of the mobile device 10B (step S312). When the mobile speed is smaller than 30 km/h, the CQI correction value is set to be "−1" (step S313). When the mobile speed ranges 30 km/h to 120 km/h, the CQI correction value is set to be "−2" (step S314). When the mobile speed exceeds 120 km/h, the CQI correction value is set to be "−4" (step S315).

As described above, the CQI correction value is determined by using both of the block error rate and the mobile speed of the mobile device 10B, thereby calculating a more appropriate CQI value. In addition, the CQI correction value calculating method according to the second embodiment of the present invention may be used together with the CQI correction value calculating method according to the third embodiment of the present invention. That is to say, the CQI correction value of FIG. 7 may be further adjusted in accordance with the CQI value that has been calculated by the CQI converter 15.

Figure 9:
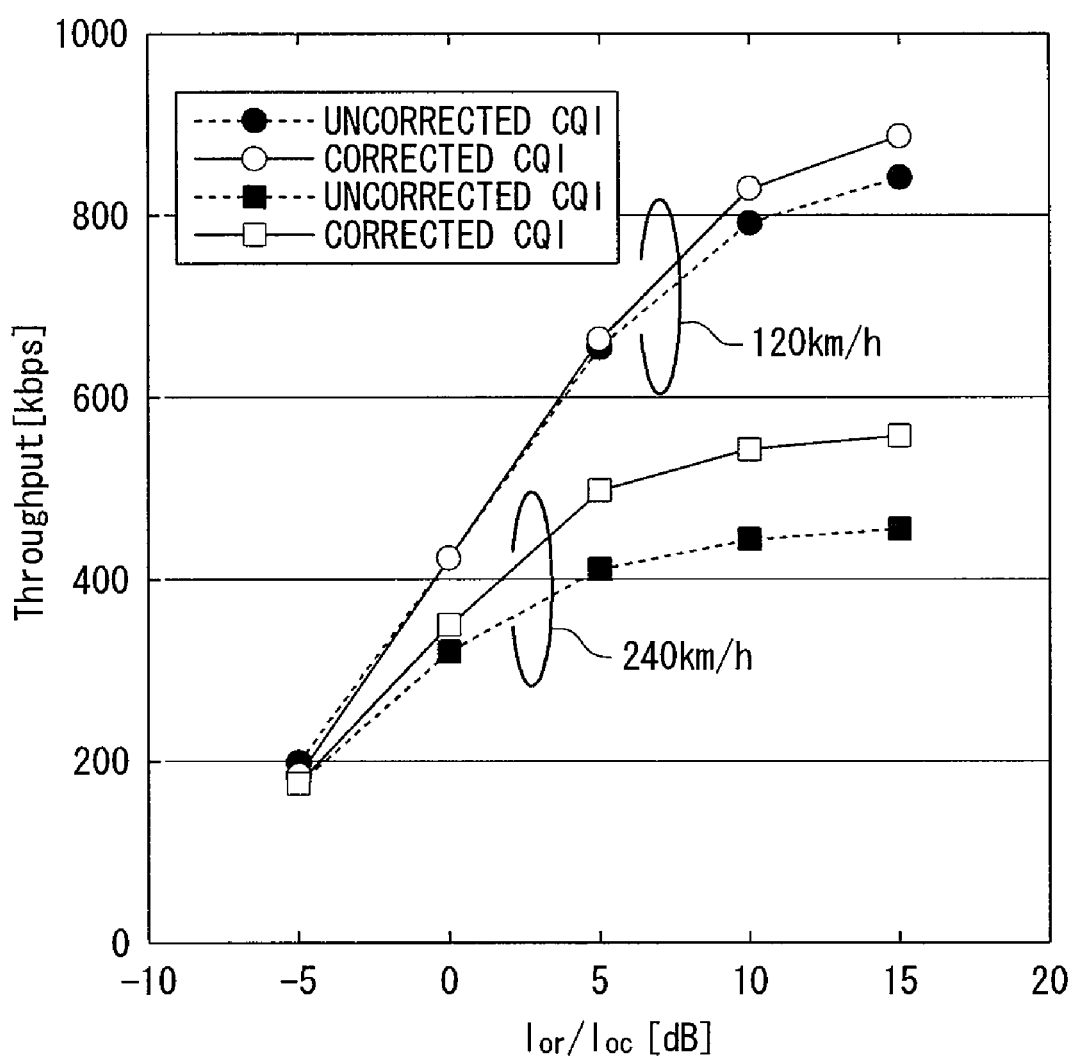
FIG. 9 is a graph showing simulation results of the throughput in cases where the CQI correction is performed and is not performed.

FIG. 9 is a graph showing simulation results of the throughput in cases where the CQI correction is performed and is not performed and where the mobile speeds of a mobile device are 120 km/h and 240 km/h. The horizontal axis of the graph indicates $I_{or}/I_{oc}$ [dB] indicative of a ratio of a desired signal to an interference signal. The vertical axis of the graph indicates the throughput [kbps]. This graph exhibits that the throughput has been improved in a significant manner in the high speed environment of 120 km/h and 240 km/h, be performing the CQI correction.

As described heretofore, the CQI correcting section 20 of the mobile device corrects the CQI value that has been calculated by the CQI converter 15, in accordance with the block error rate that has been calculated by the BLER calculating section 19 and the mobile speed of the mobile device. Then, the CQI transmitter 16 transmits the corrected CQI value to the base transceiver station. Therefore, whenever the CQI value is calculated, the CQI value is corrected to an optimal value in accordance with the reception environment at each time. This allows the CQI value to be calculated with higher accuracy than the correction of the threshold value in the conversion table. Therefore, a more accurate reception environment can be reported, thereby achieving a more excellent throughput.

Furthermore, since the variation of the TBS value relative to the change in the CQI value permits the CQI value to be adjusted, an optimal CQI correction value that improves the block error rate in an appropriate manner can be selected dynamically. This facilitates the improvement in the throughput.

According to an aspect of the present invention, even if the reception environment is low in the measurement accuracy, the CQI value is corrected in an appropriate manner dynamically so as to make a report of the reception environment with accuracy, thereby improving the throughput.

What is claimed is:

1. A communication terminal device comprising:
a reception environment measuring section that measures a reception environment of a reception signal that has been received from a transmitter;
a feedback value generating section that generates a feedback value for making a report of the reception environment that has been measured by the reception environment measuring section, the reception environment being controlled in a suitable manner by transmitting the feedback value representing the reception environment to the transmitter;
a block error rate calculating section that calculates a block error rate, which is a rate of occurrence of a reception error by each block;
a correspondence relationship memory that stores a correspondence relationship between a plurality of the feedback values and a transport block size of a signal to be expected to be transmitted from the transmitter that has received each of the plurality of the feedback values;
a correcting section that corrects the feedback value by referring to the correspondence relationship memory when a difference between the transport block size corresponding to the feedback value generated by the feedback value generating section and the transport block size to be corrected is greater than a predetermined value; and
a reception environment reporting section that transmits to the transmitter the feedback value that has been corrected by the correcting section.

2. The communication terminal device according to claim 1, wherein the correcting section corrects the feedback value so that the block error rate of the reception signal is closer to a predetermined optimal value.

3. The communication terminal device according to claim 1, wherein the feedback value is corrected in accordance with a mobile speed of the communication terminal device.

4. A reception environment reporting method comprising:
measuring a reception environment of a reception signal that has been received from a transmitter;
generating a feedback value for making a report of the reception environment that has been measured, the reception environment being controlled in a suitable manner by transmitting the feedback value representing the reception environment to the transmitter;
calculating a block error rate, which is a rate of occurrence of a reception error by each block;
storing in a correspondence relationship memory a correspondence relationship between a plurality of the feedback values and a transport block size of a signal to be expected to be transmitted from the transmitter that has received each of the plurality of the feedback values;
correcting the feedback value by referring to the correspondence relationship memory when a difference between the transport block size corresponding to the feedback value generated in the generating the feedback value and the transport block size to be corrected is greater than a predetermined value; and
transmitting to the transmitter the feedback value that has been corrected.

* * * * *